US005485462A

United States Patent [19]

Helm et al.

[11] Patent Number: 5,485,462

[45] Date of Patent: Jan. 16, 1996

[54] METHOD OF FACILITATING AN AUDIO SOURCE CHANGE IN A DIGITAL RADIO COMMUNICATION SYSTEM

[76] Inventors: David Helm, 1518 Pearl Ave., Glendale Heights, Ill. 60139; William Felderman, 1310 Spring Beach Rd., Cary, Ill. 60013

[21] Appl. No.: 296,197

[22] Filed: Aug. 25, 1994

[51] Int. Cl.[6] .......... H04Q 7/22

[52] U.S. Cl. .......... 370/95.1; 370/95.3; 379/60; 455/33.2

[58] Field of Search .......... 370/13, 17, 94.1, 370/95.1, 95.3, 110.1; 379/59, 60, 63; 380/48, 49; 455/33.1–33.4

[56] References Cited

U.S. PATENT DOCUMENTS 5,081,679 1/1992 Dent .......... 455/33.2 X
5,243,653 9/1993 Malek et al. .......... 455/33.1 X
5,293,423 3/1994 Dahlin et al. .......... 455/33.1 X
5,305,308 4/1994 English et al. .......... 370/95.3 X
5,325,419 6/1994 Connolly et al. .......... 455/33.1 X

*Primary Examiner*—Melvin Marcelo
*Attorney, Agent, or Firm*—James A. Coffing

[57] ABSTRACT

The present invention encompasses a method of facilitating an audio source change in a digital radio communication system (100). A typical system includes a plurality of audio source units ( 101–103), a plurality of audio destination units (105, 106), and a switching unit (108) for rendering one of the plurality of audio source units (101–103) operable. Upon receipt (302) of an information-bearing frame from an audio source unit, a frame sequence value is identified (304). The expected frame sequence value is then determined (306), and this value is compared to the identified frame sequence value to determine whether or not the received frame sequence value matches the expected frame sequence value. When the frame sequence values match, it is assumed that the frames were sourced from the same audio source unit (i.e., no source change has occurred). When a mismatch is detected, a source change indication is transmitted by the audio destination units to the communication unit (310), thereby facilitating the audio source change.

11 Claims, 3 Drawing Sheets

METHOD OF FACILITATING AN AUDIO SOURCE CHANGE IN A DIGITAL RADIO COMMUNICATION SYSTEM

FIELD OF THE INVENTION

The present invention relates generally to communication systems and, in particular, to facilitating an audio source change in a digital radio communication system.

BACKGROUND OF THE INVENTION

Digital radio communication systems are known in the art. Such systems typically include a plurality of audio source units, a plurality of audio destination units, a switching unit for selecting which of the plurality of audio source units is presently operable, and a plurality of communication units. Switching from one audio source unit to another (e.g., as a result of a mobile communication unit roaming from one coverage area to another) causes unintelligible audio at the receiving end. A typical digital radio communication system employs encryption parameters at the sourcing end to provide encrypted voice to the receiving communication unit. Thus, the receiving communication unit must have the corresponding decrypting parameters to properly decode the received encrypted signals, as next described.

Upon reception of a preamble signal by the communication unit, the communication unit examines a so-called encryption synchronization (ESYNC) field of the preamble, and adjusts the encryption algorithm and secure key for the duration of the call. If the audio source changes, the communication unit must reset its operating parameters (e.g., encryption and secure key parameters) to ensure compatibility with the new audio source unit. However, if the communication unit is not notified that there is a new audio source unit, the communication unit attempts to decrypt the new audio using the old parameters, thereby providing unrecognizable audio to the user.

One technique for notifying the receiving communication unit that the audio source unit has changed is to encode each audio packet with control information identifying the audio source for that packet. However, this approach requires an undesirable amount of bandwidth, which could otherwise be used to convey speech.

Another technique for notifying the receiving radio that the audio source unit has changed is to have the radio automatically look for a new encryption parameter upon radio detection of a switch (e.g., garbled audio followed by a mute). However, this would likely result in undesirable audio delays and perhaps even lost speech.

Accordingly, there exists a need for a method of facilitating an audio source change as between a plurality of audio source units. In particular, a method is needed that automatically determines the occurrence of an audio source change based on known expected frame sequences, thereby resulting in facilitation of the audio source change without the constraints of prior art systems.

DETAILED DESCRIPTION OF A PREFERRED EMBODIMENT

Generally, the present invention encompasses a method of facilitating an audio source change in a digital radio communications system. A typical system might comprise a plurality of audio source units, a plurality of audio destination units, and a switching unit for rendering one of the plurality of audio source units operable. Upon receipt of an information-bearing frame from an audio source unit, a frame sequence value is identified. The identified frame sequence value is then compared with an expected frame sequence value to determine whether or not the received frame sequence value matches the expected frame sequence value. When the frame sequence values match, it is assumed that the frames were sourced from the same audio source unit (i.e., no source change has occurred). When a mismatch is detected, a source change indication is transmitted by the audio destination units to the communication unit, thereby facilitating the audio source change.

Figure 1:
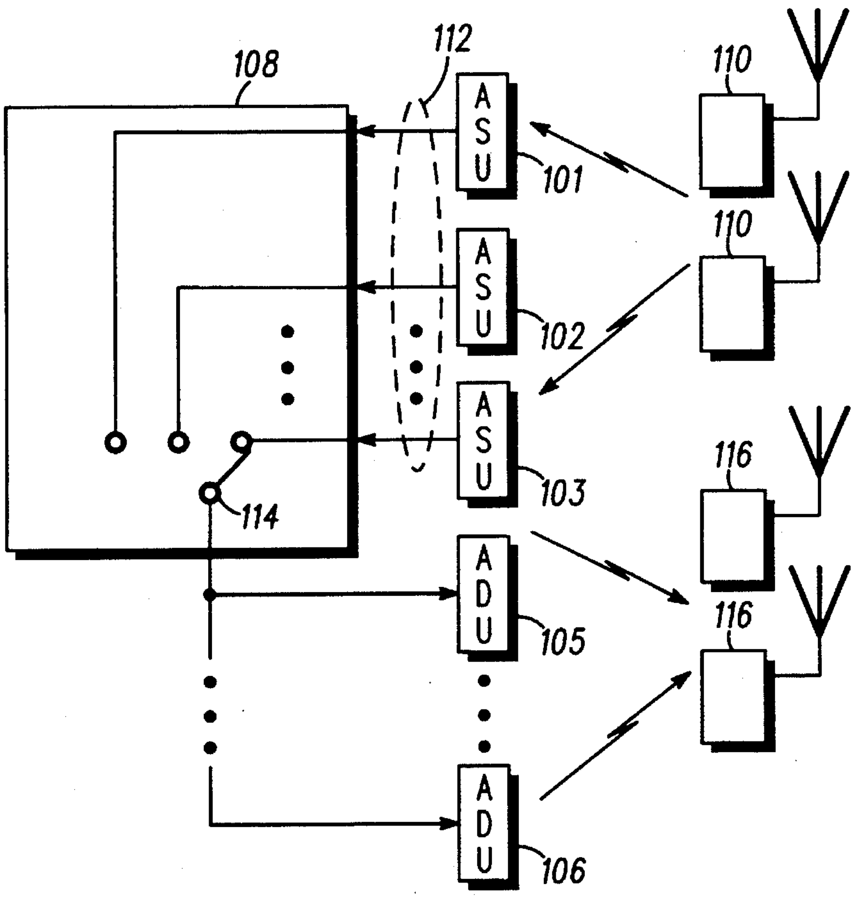
FIG. 1 shows a digital radio communications system, in accordance with the present invention.

The present invention can be better understood with reference to FIGS. 1–4. FIG. 1 shows a simplified block diagram of a radio communication system (100), in accordance with the present invention. A plurality of audio source units (101–103) operate to source digital information to a plurality of audio destination units (105–106). A switching unit (108) is used to select one of the audio source units whose information is to be routed to the appropriate audio destination unit(s). As an example, when a communication unit (110) roams between the coverage area supported by a station, or audio source unit (101), into the coverage area supported by another station (102), the signal strength from station (102) increases. Communication links (112) and an audio switch (114) operate to switchably engage one of the audio source units (101–103) to at least one of the plurality of audio destination units (105–106)—e.g., as determined by the relative signal strengths of the multiple sourcing units (101–103). In a preferred embodiment, the communication links (112) are wireline digital links, while the audio switch (114) might be an Ambassador Electronics Bank (AEB), a Digital Access Cross-connect Switch (DACS), a Private Branch Exchange (PBX), or the like. The routed audio is then transmitted from the audio destination units (105–106) to a plurality of receiving communication units (116), thereby completing the communication session. In this manner, the present invention provides for a transparent change from one audio source unit to another, as herein described.

In a preferred embodiment, audio sourcing consists of communication units (e.g., radios, consoles) transmitting audio to a plurality of base stations. The base stations route these received signals to a comparator, which weighs and sums the received audio signals and sends the summed audio to the switching unit (it should be noted that this technique is known in the communication art). The audio switch receives the digital signal and routes it to one or more destination units. Of course, due to the symmetrical nature of such a system, the audio destination units also comprise base stations that transmit the audio signal to a plurality of communication units.

Figure 2:
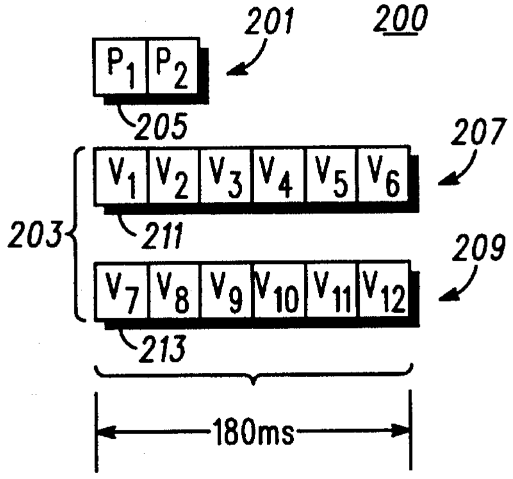
FIG. 2 shows a data stream that may be employed in a preferred embodiment of the present invention.

FIG. 2 shows a data stream (200) that includes a preamble portion (201) and an information-bearing portion (203). In a preferred embodiment, the preamble portion comprises two preamble frames ($P_1$, $P_2$) and occupies a time interval of approximately 65 milliseconds. Likewise, a preferred information-bearing portion (203) comprises two logic data units (LDU's; 207, 209) that each comprise six vector sum excited linear predictive (VSELP) encoded frames. Each of the two LDU's (207, 209) begin with a boundary frame (211, 213, respectively) and preferably occupy a time interval of 180 milliseconds. Similarly, a predetermined boundary frame (205) constitutes a first frame of the preamble portion (201). These boundary frames (205, 211, 213) are used as special markers for determining when an audio change has occurred, as later described. Each VSELP frame (207, 209) comprises audio and control information, while each preamble frame (201) comprises control information but no audio information. In a preferred embodiment, the audio portion of the VSELP frames contain VSELP code words representing approximately 30 ms of actual speech. The control information contains infrastructure information and communication unit information necessary to control the flow of the signal. Further, the frame sequence value (e.g., $V_3$, $P_2$, $V_7$) constitutes a part of the control information contained in the VSELP and preamble frames.

Figure 3:
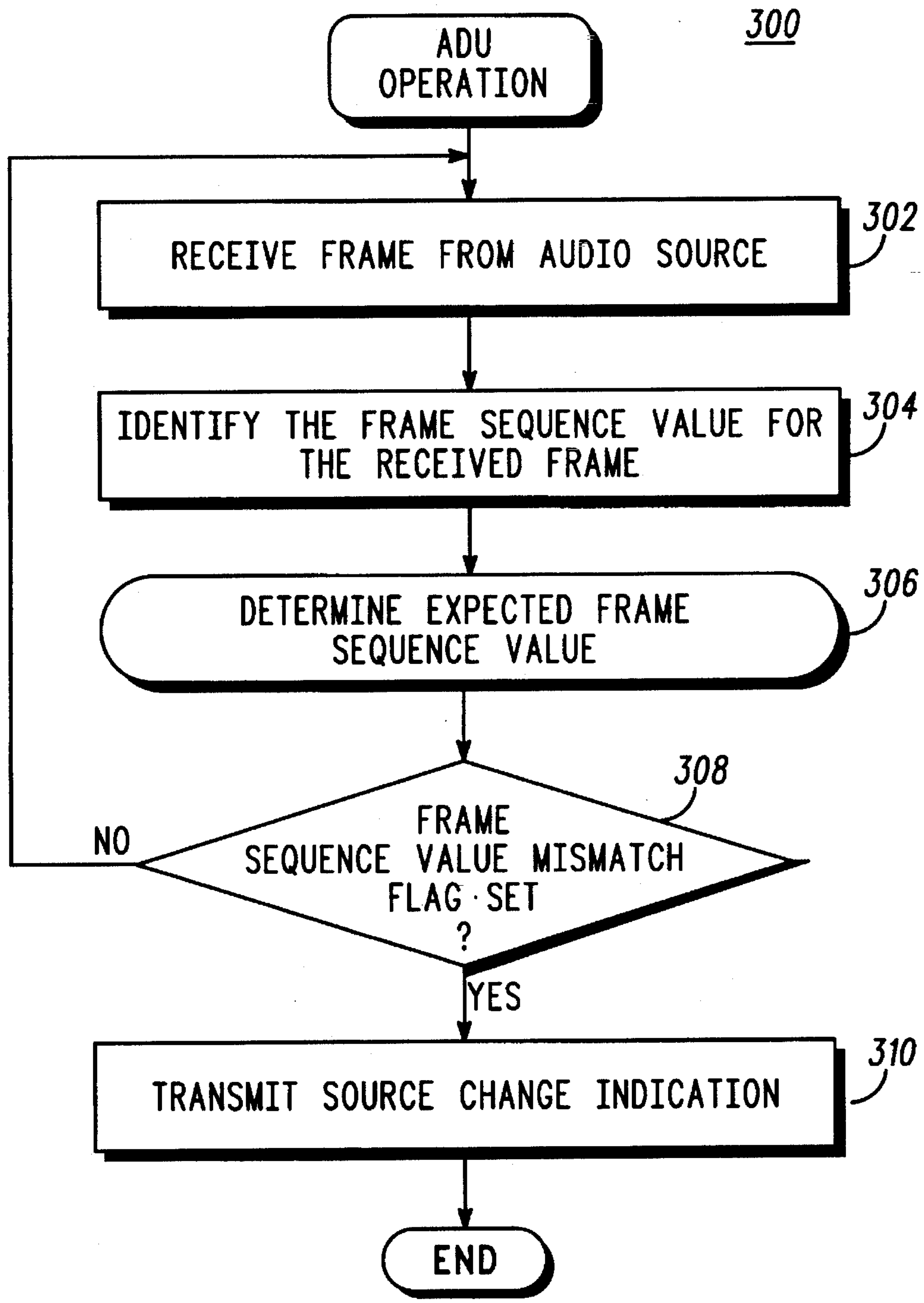
FIG. 3 shows a data flow diagram depicting the operation of an audio destination unit, in accordance with the present invention.

FIG. 3 shows a data flow diagram (300) that depicts operation of the destination units (105, 106) shown in FIG. 1. Upon receipt (302) of a digital frame from the switching unit (108), the frame sequence value for the received frame is identified (304). An expected framed sequence value is then determined (306) and compared (308) to the received framed sequence value. If the framed sequence values match, the next frame is received (302).

Generally, the operable audio source unit ensures that the transmitted sequence of frames will arrive in the order shown in FIG. 2. That is, when the audio destination unit detects that the frame sequence value does not follow this order, it is assumed that the audio source unit has changed—i.e., that the switch has engaged to render a different audio source operable. Accordingly, when the expected frame sequence value does not match the received frame sequence value, a source change indication is transmitted (310) to the communication unit, and the routine is exited. In the foregoing manner, an audio source change can be facilitated, thereby resulting in the communication units (116) being alerted as to the occurrence of an audio source change.

Figure 4:
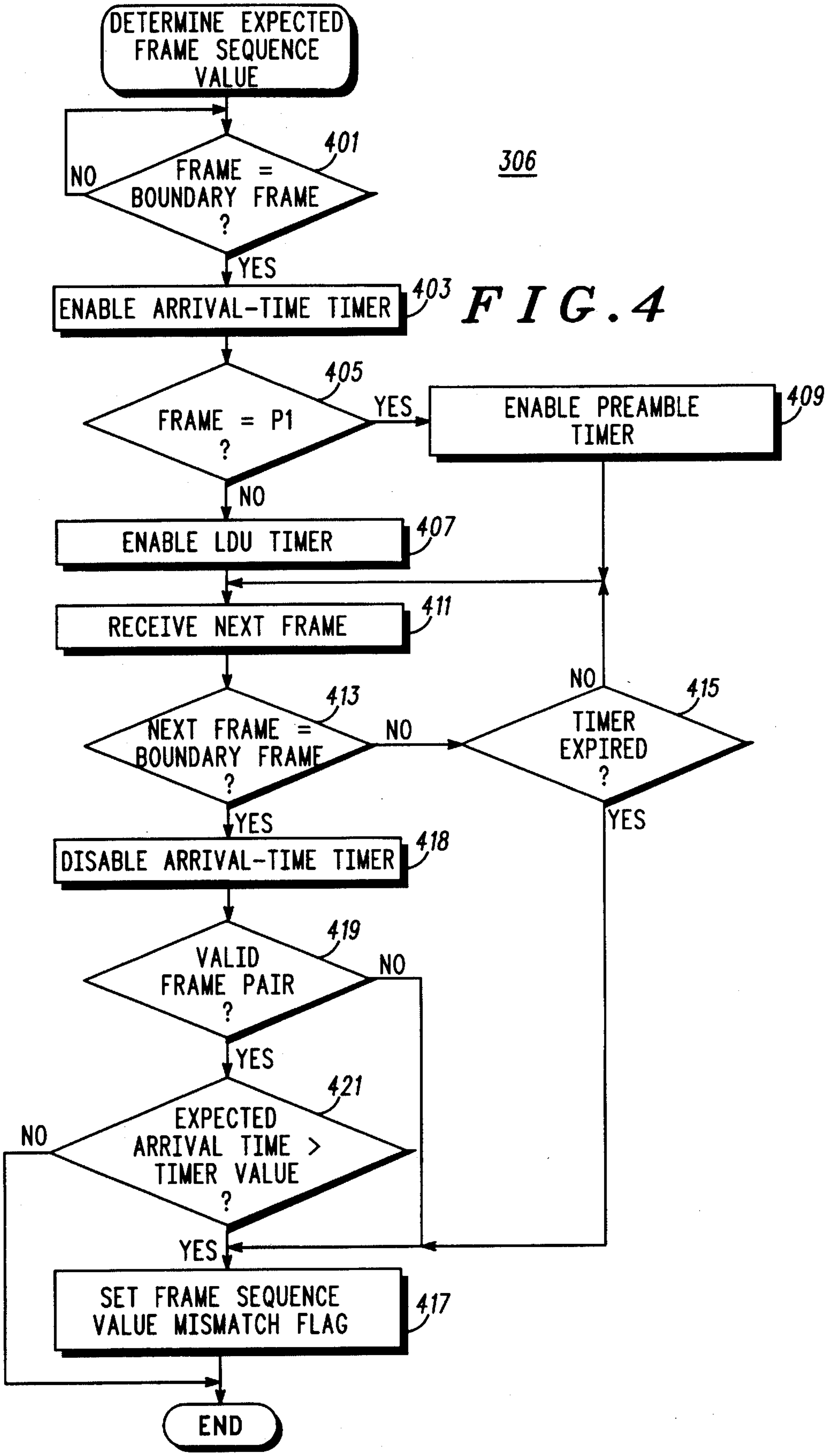
FIG. 4 shows a data flow diagram depicting a preferred method of determining an expected sequence frame value, in accordance with the present invention.

FIG. 4 shows a more detailed description of the expected frame sequence value determination step (306) shown in FIG. 3. A decision (401) is reached to determine whether or not the received frame is a boundary frame. If the received frame is not a boundary frame, the next frame is received. If the received frame is a boundary frame, an arrival-time timer is enabled (403). In a preferred embodiment, the arrival-time timer is a so-called count-up timer and is used to define a window in which a subsequent boundary frame should be received. A decision (405) is then reached to determine whether or not the received boundary frame is a predetermined boundary frame—i.e., a $P_1$ frame. If the received boundary frame is a $P_1$ frame, the preamble timer is enabled (409), while any other boundary frame results in the enabling (407) of an LDU timer. That is, the timer selected depends on whether or not the received boundary frame is part of the preamble portion or the information-bearing portion of the data stream (recall that these portions, in a preferred embodiment, are of unequal lengths). In a preferred embodiment, the preamble and LDU timers comprise so-called count-down timers—i.e., having a initial value of 65 ms or 180 ms, respectively, and expiring when a zero value is reached.

Upon receipt (411) of the next digital frame, a determination (413) is made as to whether or not the next frame is a boundary frame. If the next frame is not a boundary frame, a decision is reached (415) as to whether or not the enabled timer (i.e., LDU timer or preamble timer) has expired. If the timer has not expired, the next frame is received (411), while an expired timer results in the frame sequence value mismatch flag being set (417) before the routine is exited. It should be noted that when the timer expires before a subsequent boundary frame is received, the next expected boundary frame was not received on time. Generally, this happens only when the switch ceases sourcing the audio from the first audio source—i.e., that an audio source change has occurred. When a boundary frame is timely received (i.e., before expiration of the enabled timer), it is then necessary to determine if the received boundary, together with the previously received boundary frame, constitute a valid frame pair, as next described.

To illustrate what constitutes a valid frame pair, a normal communication sequence is described, wherein a new audio source unit transmits boundary flames in the following sequence: $P_1$, $V_1$, $V_7$, $V_1$, $V_7$, $V_1$ . . . $V_1$, $V_7$, etc. Note that the sequence of alternating LDU boundary flames ($V_1$, $V_7$) continues until the communication ends or the audio source unit changes. Following the above sequence, valid boundary frame pairs include: $P_1/V_1$, $V_1/V_7$, and $V_7/V_1$. Thus, the boundary frame pairs $P_1/V_7$, $V_1/V_1$, $V_7/V_7$, $P_1/P_1$, $V_1/P_1$, and $V_7/P_1$ are considered invalid boundary frame pairs, in accordance with a preferred signaling protocol of the present invention. (Note that anytime a $P_1$ frame is received as the second of a pair, it is an indication that an audio source change has occurred.) Anytime one of these pairs is detected, it is an indication that the audio source unit has changed. That is, when a second timely received boundary frame does not bear a sequence value matching that of an expected boundary frame (according to the valid pairs above), it is assumed that the audio has originated from a different audio source unit. While a preferred technique detects the presence of valid boundary frame pairs, it should be apparent that non-boundary frame pairs (e.g., $V_3/V_4$) might also be used to determine validity.

Returning again to decision (413), if the received frame is a boundary frame, the arrival-time timer is disabled (418) to produce a timer value, and a decision is reached (419) to determine whether or not the successively received boundary flames constitute a valid boundary frame pair. When it is determined that the frame pair is invalid, the frame sequence value mismatch flag is set (417) and the routine is exited. When the frame pair constitutes a valid frame pair, a decision is reached (421) as to whether or not the expected arrival time is greater than the timer value produced in step (418)—i.e., whether or not the valid boundary frame was actually received earlier than expected based on the lengths of the appropriate portion (e.g., 201, 207, 209). If so, the frame sequence value mismatch flag is set (417), and the routine is exited. If the valid boundary frame is timely received, as determined by the arrival-time timer, the routine is simply exited.

The present invention provides a method for automatically detecting an audio source change in a digital communication system. In current digital communication systems, audio source changes are not able to be detected. The invention eliminates the undesirable characteristics (i.e., unintelligible audio), that can often be imparted onto the audio path of a digital radio communication system by the switching from one audio source unit to another audio source unit. This is accomplished by determining when the audio source changes and alerting the communication units of the audio source change. This allows the communication units to reset the appropriate operating parameters (e.g. encryption algorithm and secure key) for the duration of the call, thereby allowing the call to be completed. Unlike the prior art, such facilitation is accomplished without the unnecessary use of audio bandwidth or undesirable audio delays.

What is claimed is:

1. In a digital radio communication system that includes a plurality of audio source units and a switching unit that couples the plurality of audio source units to at least one communication unit, a method of facilitating an audio source change comprising the steps of:

identifying a frame sequence value for a received frame to produce an identified frame sequence value;

determining whether the identified frame sequence value matches an expected frame sequence value; and when the identified frame sequence value does not match the expected frame sequence value, transmitting a source change indication to the at least one communication unit, thereby facilitating the audio source change.

2. The method of claim 1, wherein the step of determining comprises the steps of:

providing a timer having a timer value;

enabling the timer upon receipt of a frame bearing a first frame sequence value; and if the timer expires before receipt of a frame bearing a second frame sequence value, identifying the frame bearing a second frame sequence value as being a frame that does not bear a frame sequence value matching the expected frame sequence value.

3. The method of claim 2, wherein the timer value is based, at least in part, on the first frame sequence value.

4. The method of claim 1, wherein the step of determining comprises the steps of:

determining whether the received frame and a previously received frame constitute a valid frame pair; and when the received frame and the previously received frame do not constitute a valid frame pair, identifying the received frame as being a frame that does not bear a frame sequence value matching the expected frame sequence value.

5. The method of claim 1, wherein the step of determining comprises the steps of:

determining whether the received frame is a boundary frame;

when the received frame is a boundary frame, determining whether the received frame and a previously received boundary frame constitute a valid boundary frame pair; and when the received frame and the previously received boundary frame do not constitute a valid boundary frame pair, identifying the received frame as being a frame that does not bear a frame sequence value matching the expected frame sequence value.

6. The method of claim 5, further comprising the step of:

when the received frame is a predetermined boundary frame, identifying the received frame as being a frame that does not bear a frame sequence value matching the expected frame sequence value.

7. The method of claim 1, wherein the step of determining comprises the steps of:

providing a timer;

upon receipt of a frame bearing a first frame sequence value, enabling the timer;

upon receipt of a frame bearing a second frame sequence value, disabling the timer to produce a timer value;

comparing the timer value to an expected arrival time value; and when the expected arrival time value exceeds the timer value, identifying the frame bearing a second frame sequence value as being a frame that does not bear a frame sequence value matching the expected frame sequence value.

8. In a digital radio communication system that includes a plurality of audio source units and a switching unit coupling the plurality of audio source units to a plurality of communication units, wherein communication between the plurality of audio source units and the plurality of communication units is facilitated through use of data streams that each include a preamble portion and an information-bearing portion, wherein the preamble portion and the information-bearing portion each include boundary frames, a method of alerting at least one of the plurality of communication units of an audio source change, the method comprising the steps of:

providing a timer having a timer value;

upon receipt of at least a first boundary frame, enabling the timer; and if the timer expires before receipt of a second boundary frame, transmitting a source change indication to the at least one communication unit, thereby alerting the at least one communication unit of the audio source change.

9. The method of claim 8, wherein the timer value is based, at least in part, on a frame sequence value for the first boundary frame.

10. In a digital radio communication system that includes a plurality of audio source units and a switching unit coupling the plurality of audio source units to a plurality of communication units that each operate using operating parameters, wherein communication between the plurality of audio source units and the plurality of communication units is facilitated through use of data streams that each include a preamble portion and an information-bearing portion, wherein the preamble portion and the information-bearing portion each include boundary frames, a method of alerting at least one of the plurality of communication units of an audio source change, the method comprising the steps of:

determining whether a received frame is a boundary frame;

when the received frame is a boundary frame, determining whether the received frame and a previously received boundary frame constitute a valid boundary frame pair; and when the received frame and the previously received boundary frame do not constitute a valid boundary frame pair, transmitting a source change indication to the at least one communication unit, thereby alerting the at least one communication unit of the audio source change.

11. The method of claim 10, further comprising the step of:

when the received frame is a predetermined boundary frame, transmitting a command to the at least one communication unit advising the at least one communication unit to adjust its operating parameters based on subsequently received information bearing frames.

* * * * *